(12) United States Patent
Tseng

(10) Patent No.: US 6,394,648 B1
(45) Date of Patent: May 28, 2002

(54) ELECTRONIC THERMOMETER

(75) Inventor: Daniel C. M. Tseng, Taipei Hsien (TW)

(73) Assignee: K-Jump Health Co., Ltd., Taipei Hsien (TW)

(*) Notice: Subject to any disclaimer, the term of this patent is extended or adjusted under 35 U.S.C. 154(b) by 0 days.

(21) Appl. No.: 09/717,199

(22) Filed: Nov. 22, 2000

(51) Int. Cl.[7] .............................. G01K 7/00; G01K 1/00
(52) U.S. Cl. ....................................... 374/208; 374/163
(58) Field of Search .............................. 374/208, 163; 600/549, 473–474; 200/46–49, 51–53, 5, 45 M, 45 R

(56) References Cited

U.S. PATENT DOCUMENTS

| | | | | |
|---|---|---|---|---|
| 3,580,079 A | * | 5/1971 | Crites et al. | 116/114.5 |
| 4,743,121 A | * | 5/1988 | Takagi et al. | 374/163 |
| 5,026,113 A | * | 6/1991 | DiCarlo et al. | 296/221 |
| 5,165,798 A | * | 11/1992 | Watabane | 374/208 |
| 5,340,019 A | * | 8/1994 | Bohan, Jr. et al. | 236/20 R |
| 6,068,399 A | * | 5/2000 | Tseng | 374/163 |
| 6,074,090 A | * | 6/2000 | Chen | 374/183 |
| 6,127,915 A | * | 10/2000 | Gam et al. | 338/28 |

FOREIGN PATENT DOCUMENTS

EP 0565123 A1 * 10/1993 ............. G01J/5/04

* cited by examiner

Primary Examiner—Diego F. F. Gutierrez
Assistant Examiner—Gail Verbitsky
(74) Attorney, Agent, or Firm—Bacon & Thomas, PLLC

(57) ABSTRACT

An improved electronic thermometer for measuring human body temperature includes a stem and a cartridge located in the stem. The cartridge has a slide trough, a brake member and a stopping block located at one end thereof, and a sensor means and a trigger means located therein. The trigger means includes an impact pin located in the slide trough, a sway contact strip engaged with the brake member and a contact pad engaged with the stopping block. The thermometer may be turned on or off by swinging and is watertight.

6 Claims, 7 Drawing Sheets

ELECTRONIC THERMOMETER

BACKGROUN OF THE INVENTION

This invention relates to an improved electronic thermometer and particularly an electronic thermometer that may be turned on or off by swinging and is watertight.

In the old days, taking human body temperature usually is done by using a glass tube thermometer containing mercury inside. The glass is a brittle material. When in use, the glass tube shall be swung forcefully to reset the temperature reading to zero. The glass tube could easily slip away and damage if not being held firmly during swinging. The temperature reading scale is very fine and small. The glass tube tends to reflect light in various directions. Further more mercury is silver-like color which does not have sharp contrast with the glass tube. All this make reading of temperature shown by the mercury column in the glass tube very difficult and is prone to errors.

In order to remedy aforesaid problems, electronic thermometer has been developed and introduced. FIG. 1 illustrates a conventional electronic thermometer. It has a stem 1 which includes a sensor inside (not shown in the figure), a display window 11, a probe 12 located at one end, and an opening 13 located at another end thereof. There is a switch 14 held in the opening 13. When in use, the switch 14 shall be pressed to reset the reading to zero, then make the probe 12 to contact human body for measuring body temperature. The measured temperature will be shown on the display window 11. It is more convenient and safer than glass tube thermometer.

When using the thermometer for measuring temperature of different people, the thermometer usually should be cleaned and sterilized after every usage to prevent contamination and infection. For glass tube thermometer, the cleaning and sterilization is usually done by washing or sterilizing the whole glass tube. For electronic thermometer, the cleaning and sterilization is generally done by wiping the probe and a portion of the stem with water or alcohol. The electronic thermometer cannot be dipped entirely into water or alcohol for washing or sterilizing. This is because water or alcohol might seep into the stem 1 through the opening 13 and damage the electronic elements located inside.

SUMMARY OF THE INVENTION

In view of aforesaid disadvantages, it is therefore an object of this invention to provide an improved electronic thermometer that is convenient to use and may be turned on by swinging and is watertight.

The electronic thermometer according to this invention includes a stem, a cartridge located in the stem, a sensor means located in the cartridge and a trigger means. The cartridge has a slide trough, a brake member and a stopping block. The trigger has an impact pin located in the slide trough, a sway strip attached to the brake member and a contact pad attached to the stopping block.

BRIEF DESCRIPTION OF THE DRAWINGS

The invention, as well as its many advantages, may be further understood by the following detailed description and drawings, in which.

DESCRIPTION OF THE PREFERRED EMBODIMENTS

Figure 1:
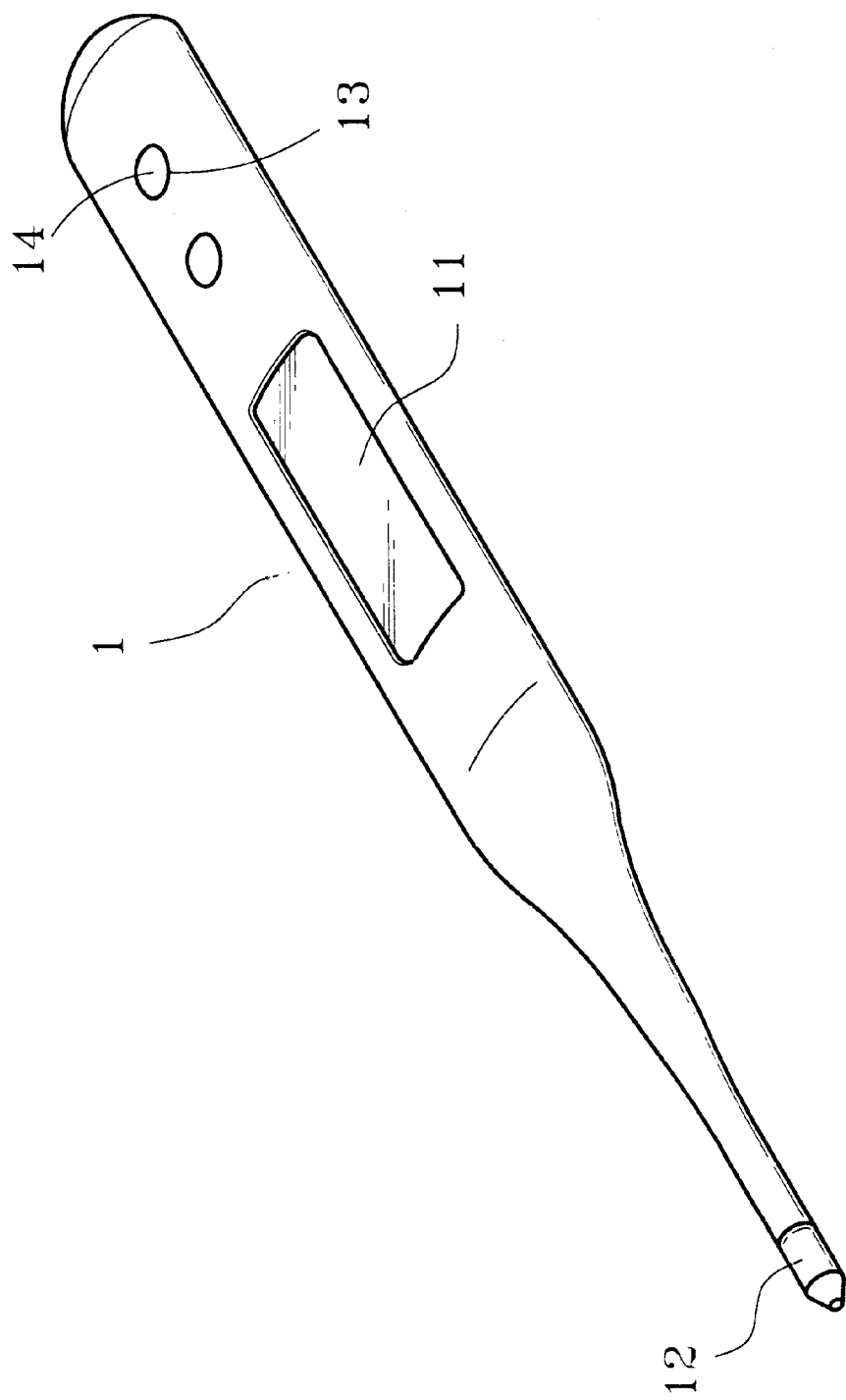
FIG. 1 is a perspective view of a conventional electronic thermometer.
Figure 2:
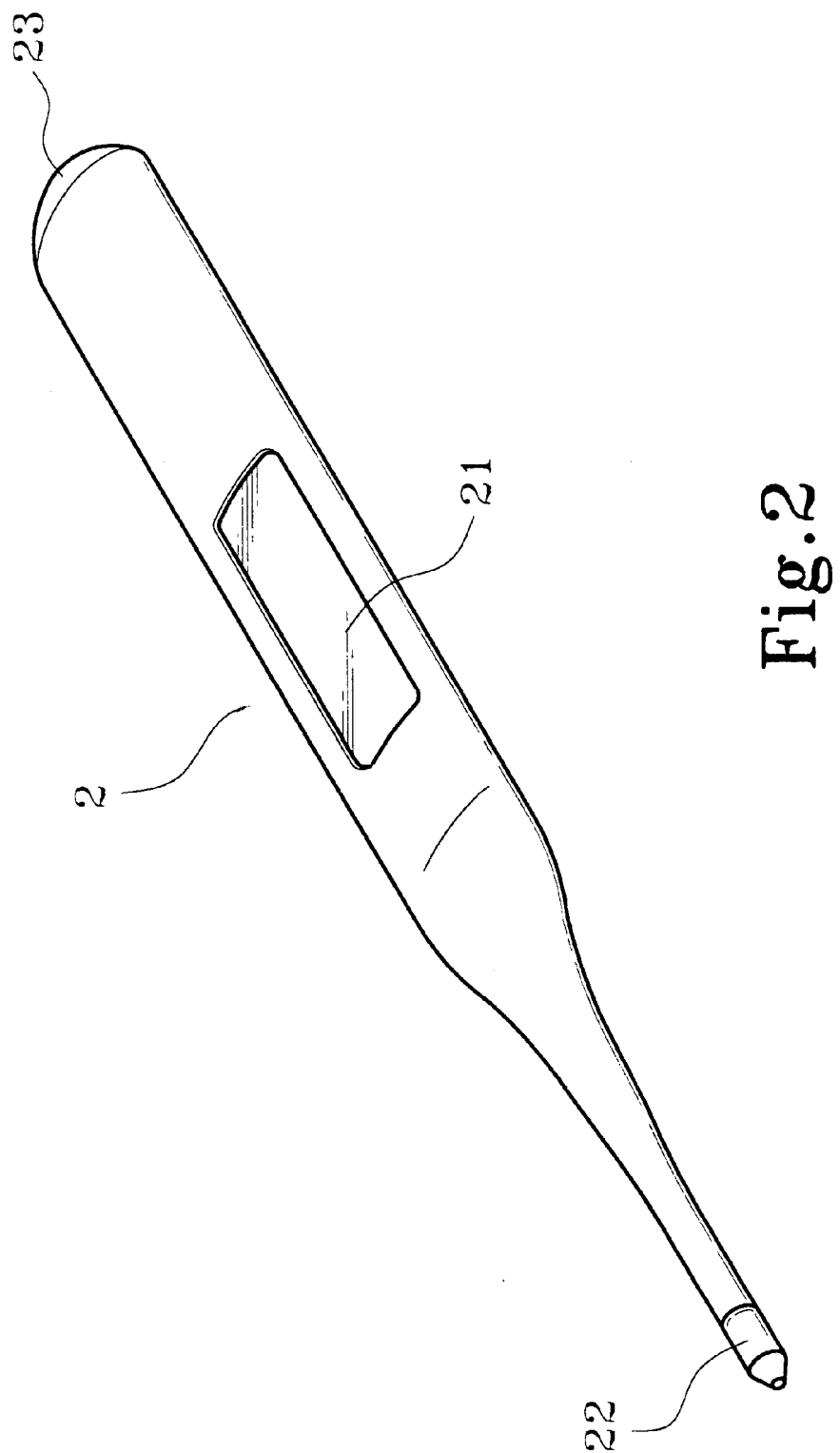
FIG. 2 is a perspective view of this invention.
Figure 3:
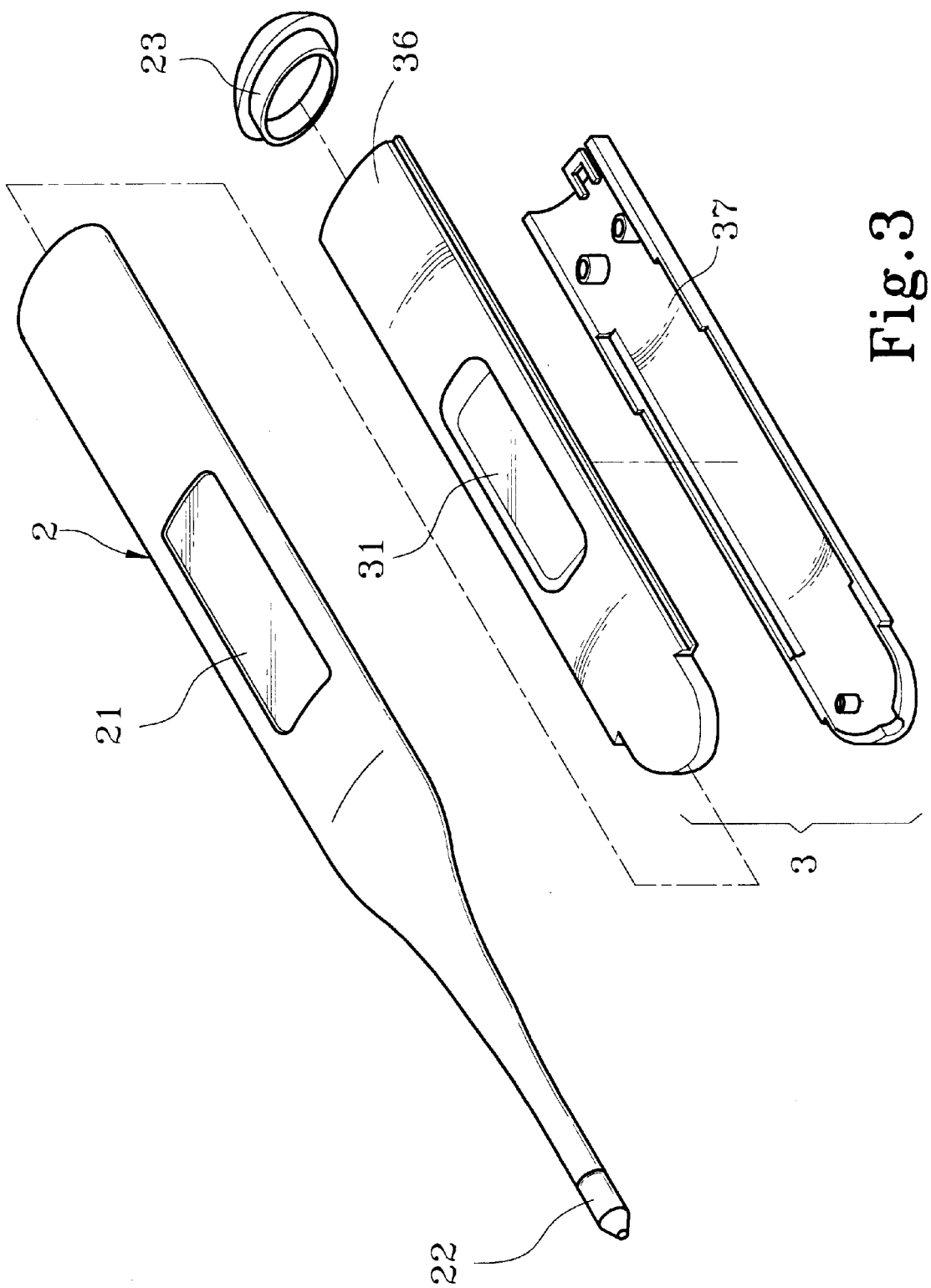
FIG. 3 is a partial exploded view of this invention.

Referring to FIGS. 2 and 3, the electronic thermometer according to this invention includes a stem 2, a cartridge 3, a sensor means 4 and a trigger means 5. It may be used for measuring human body temperature easily and may be turned on by swinging and is watertight.

The stem 2 is made of transparent, flexible and bendable soft plastics by integral forming, and has a viewing window 21 formed at a selected location, a probe 22 at one end, and a rear cap 23 at another end thereof.

Figure 4:
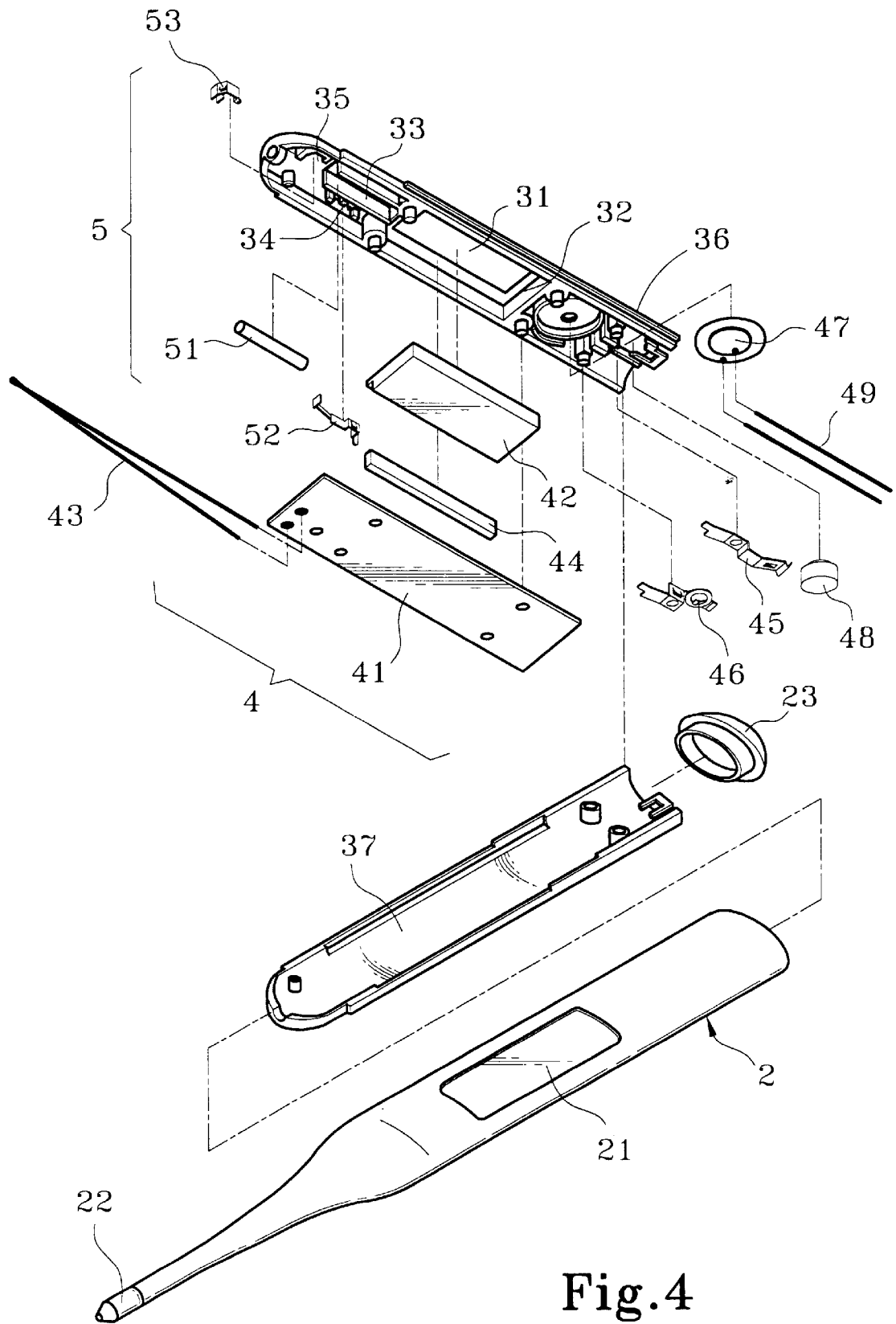
FIG. 4 is an exploded view of this invention

Referring to FIGS. 3 and 4, the cartridge 3 is housed in the stem 2 and includes an upper shell 36 and a lower shell 37. The cartridge 3 includes a chamber 32 which has an opening 31 mating against the viewing window 21, and a slide trough 33 and a stopping block 35 located at one end thereof. There is brake member 34 located at one side of the slide trough 33. The stopping block 35 is opposite to one end of the slide trough 33.

The sensor means 4 is located in the cartridge 3 and includes a circuit board 41, a display panel 42, a thermal wire 43, a conductive bar 44, a pair of positive and negative elastic strips 45 and 46, a buzzer 47, a battery 48 and a conductive wire 49. The display panel 42 is located in the opening 31 to be seen through the viewing window 21.

The brake means 5 includes an impact pin 51 movably located in the slide trough 33, a sway contact strip 52 engaged with the brake member 34 and a contact pad 53 mounted on the stopping block 35. The circuit in the sensor means 4 is known in the art and forms no part of this invention, thus will be omitted herein.

Figure 5A:
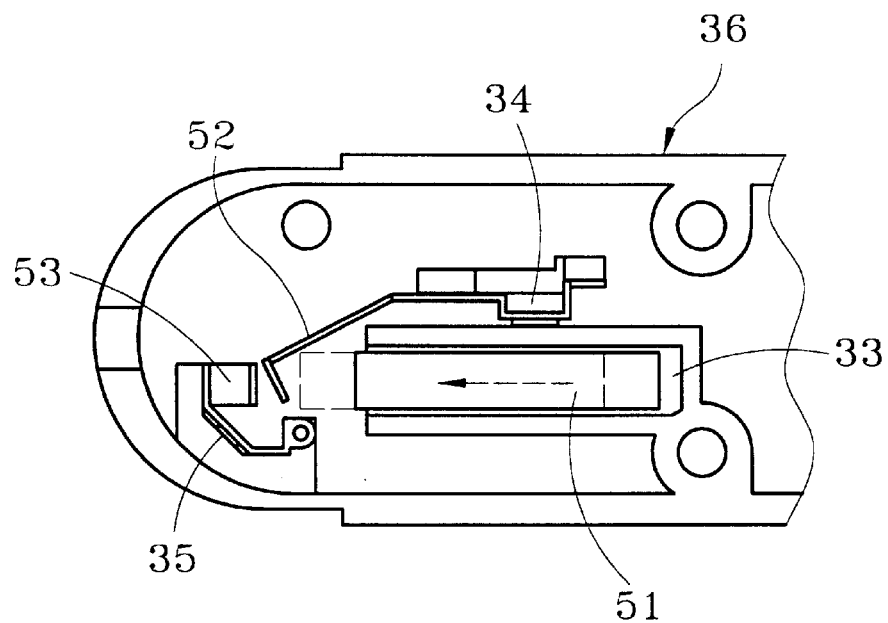
FIG. 5A is a fragmentary schematic view of this invention in use.
Figure 5B:
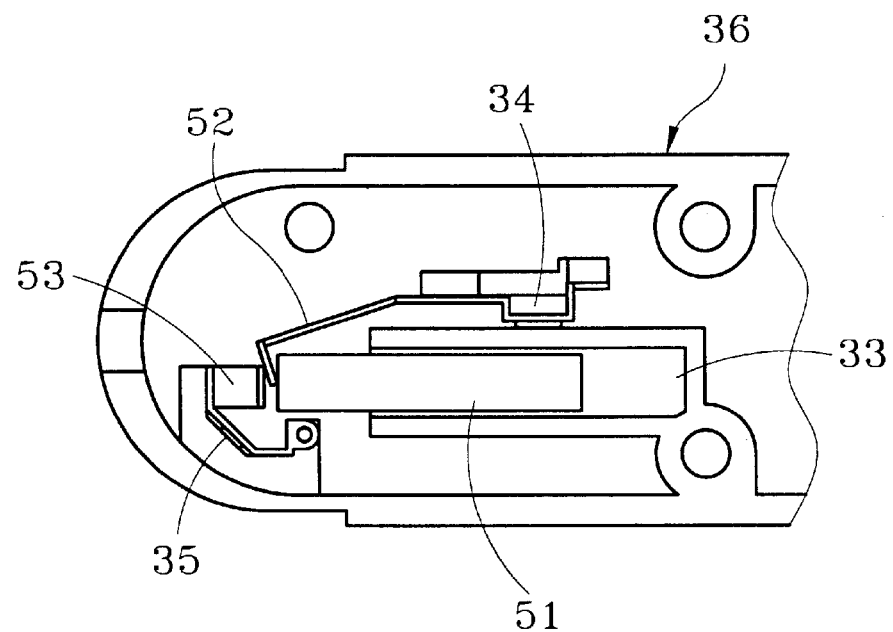
FIG. 5B is another fragmentary schematic view of this invention in use.

Referring to FIGS. 2, 5A and 5B, when this invention is in use, the reading of the thermometer should be reset to zero first. This may be done by holding the stem 2 at the end where the rear cap 23 located, then swinging the stem 2. As a result, the impact pin 51 will slide and move in the slide trough 33, and hits the sway contact strip 52. The sway contact strip 52 will be pushed and swung to make contact with the contact pad 53. This action may serve a button switch function to reset the temperature reading to zero. The reset thermometer then may be used to measure human body temperature through the probe 22. The temperature reading will be displayed on the display panel 42 and be seen through the viewing window 21. As the switch is built in the cartridge 3 and housed in the stem 2 which is completely sealed, the entire thermometer may be soaked in water or alcohol for cleaning or sterilizing without the risk of damaging circuits and components located inside. Hence this invention not only may measure body temperature quickly and accurately, but also may be cleaned and sterilized easily and effectively.

Figure 6:
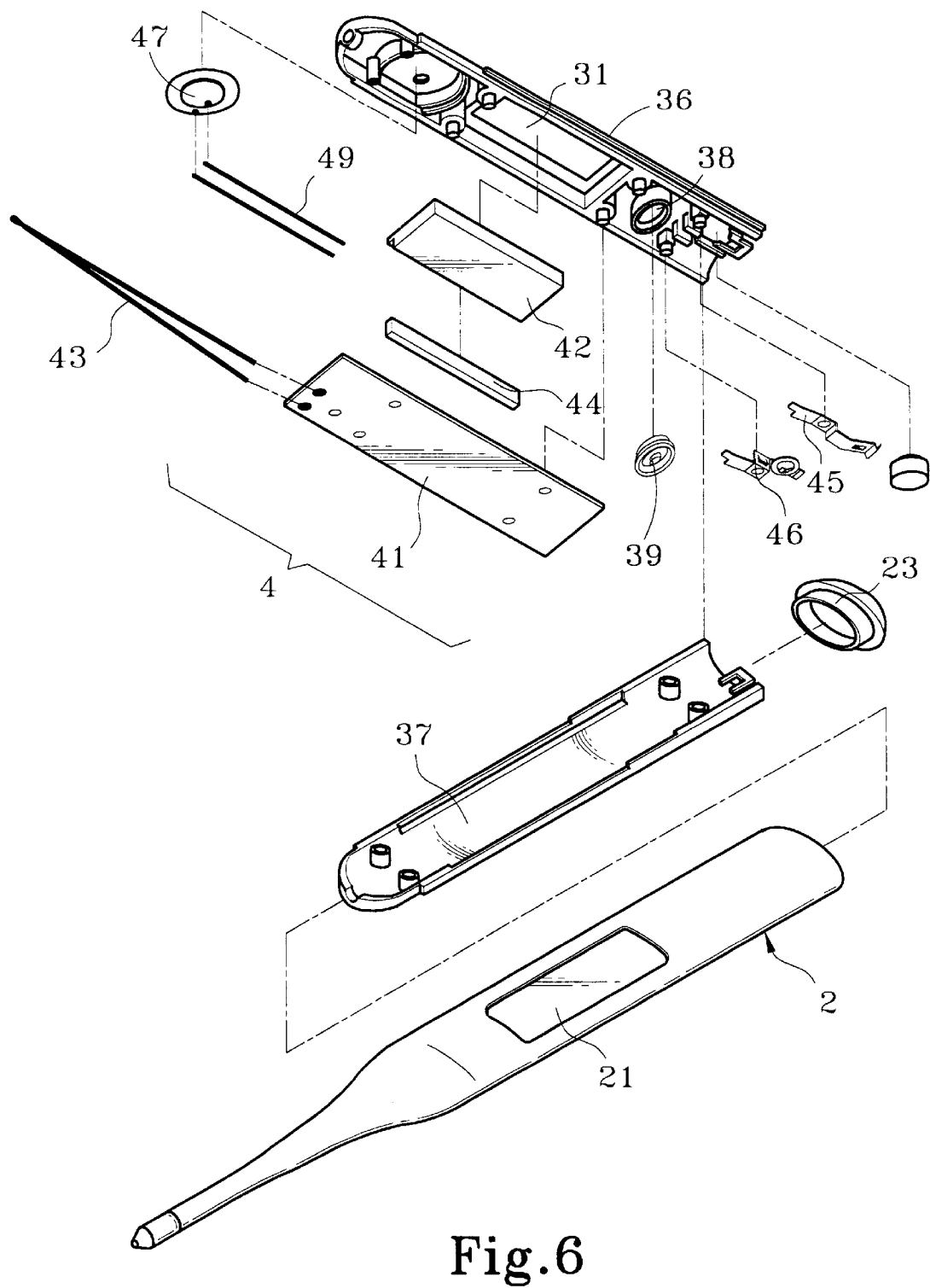
FIG. 6 is an exploded view of another embodiment of this invention.
Figure 7:
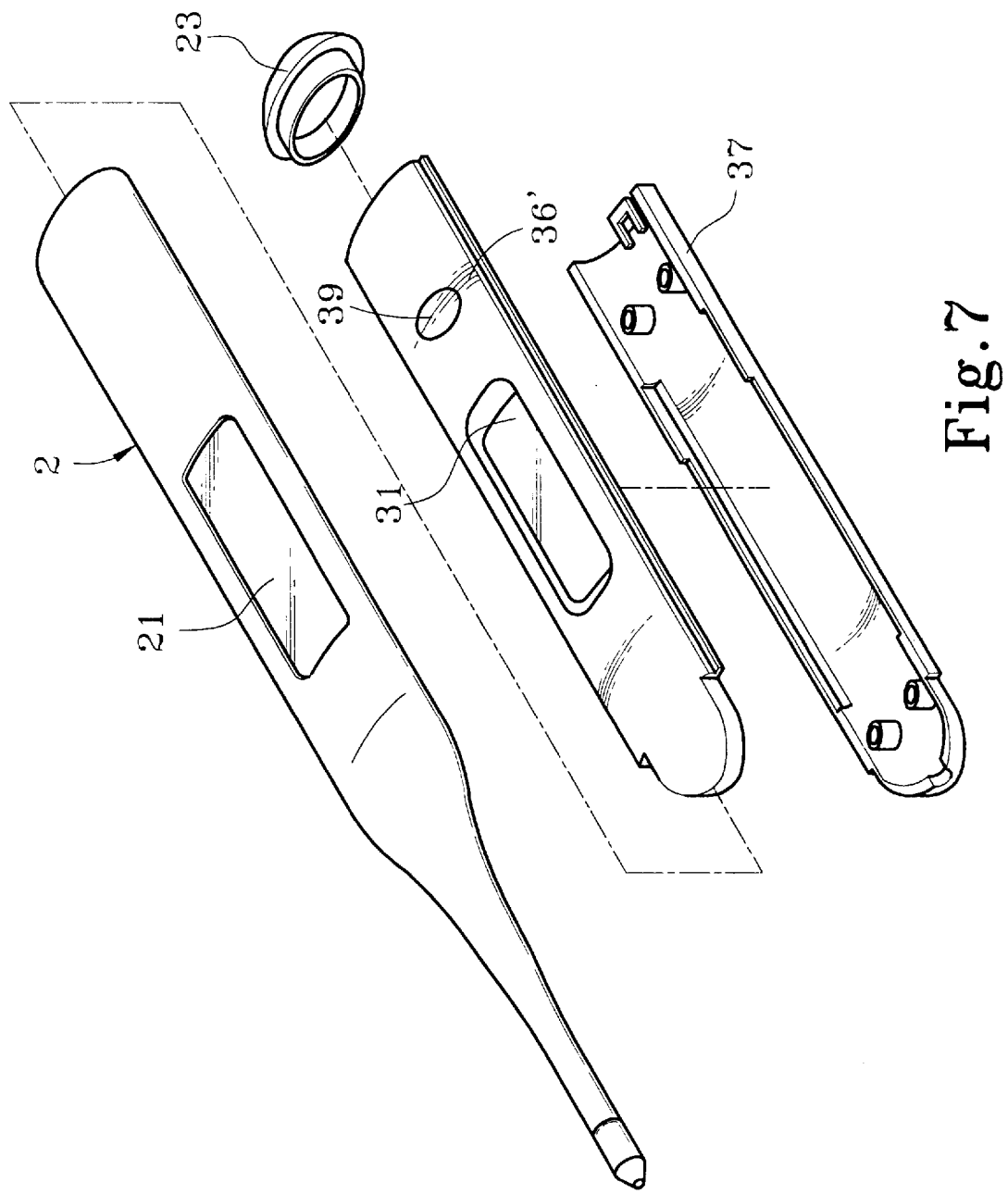
FIG. 7 is a partial exploded view of another embodiment of this invention.

FIGS. 6 and 7 show another embodiment of this invention. It is largely constructed like the one shown in FIGS. 3 and 4. However this embodiment has a different trigger means. The trigger means includes a press section 38 formed in the upper shell 36' and a button key 39 located on the upper shell 36' above the press section 38. In the cartridge 3', there is also a sensor means 4 which includes a circuit board 41, a display panel 42, a thermal wire 43, a conductive bar 44, a pair of positive and negative elastic strips 45 and 46, a buzzer 47, a battery 48 and a conductive wire 49. The display panel 42 is located in the opening 31 of the chamber 32 to be seen through the viewing window 21. Then the upper shell 36' and lower shell 37' are coupled together to form the completed cartridge 3' and to be housed in the stem 2. The stem 2 is made of transparent, flexible and bendable soft plastics by integral forming. The button key 39 may be pressed from the stem 2 to turn on the thermometer for use. The stem 2 may be made watertight. It is thus convenient to use and easy to clean and sterilize.

In summary, this invention offers an improved electronic thermometer that eliminates the disadvantages of conventional electronic thermometers, and may be used conveniently and effectively and has greater durability.

What is claimed is:

1. An improved electronic thermometer for measuring human body temperature, comprising:

a stem having a probe at one end and a rear cap at another end thereof;

a cartridge housed in the stem including an upper shell and a lower shell housed in the stem, a slide trough located at one end thereof, a brake member located at one side of the slide trough and a stopping block located at one end of the slide trough, a sensor means located in the cartridge; and a trigger means including an impact pin located in the slide trough, a sway contact strip engaged with the brake member, and a contact pad engaged with the stopping block;

wherein the thermometer is watertight and is capable turning on or off by swinging.

2. The improved electronic thermometer of claim 1, wherein the stem is made of transparent, flexible and bendable plastics by integral forming.

3. The improved electronic thermometer of claim 1, wherein the stem has a viewing window formed at a selected location thereof.

4. The improved electronic thermometer of claim 1, wherein the cartridge has a chamber which has an opening.

5. The improved electronic thermometer of claim 1, wherein the sensor means includes a circuit board, a display panel, a thermal wire, a conductive bar, a pair of positive and negative elastic strips, a buzzer, a battery and a conductive wire.

6. The improved electronic thermometer of claim 1, wherein the trigger means is replaced by a pressing section formed in the cartridge and a button key located above the pressing section for switching on and off the thermometer.

\* \* \* \* \*